(12) United States Patent
Vaubel et al.

(10) Patent No.: US 10,916,985 B2
(45) Date of Patent: Feb. 9, 2021

(54) METHOD OF FORMING A STATOR ASSEMBLY

(71) Applicant: GM Global Technology Operations LLC, Detroit, MI (US)

(72) Inventors: Scott Vaubel, Attica, MI (US); John D. Campbell, Rochester Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 255 days.

(21) Appl. No.: 15/945,256

(22) Filed: Apr. 4, 2018

(65) Prior Publication Data

US 2019/0312477 A1 Oct. 10, 2019

(51) Int. Cl.
*H02K 3/24* (2006.01)
*H02K 1/16* (2006.01)
*H02K 15/085* (2006.01)
*H02K 15/04* (2006.01)
*H02K 3/14* (2006.01)

(52) U.S. Cl.
CPC ............ *H02K 3/24* (2013.01); *H02K 1/16* (2013.01); *H02K 3/14* (2013.01); *H02K 15/0421* (2013.01); *H02K 15/085* (2013.01)

(58) Field of Classification Search
CPC .... H02K 15/0421; H02K 15/085; H02K 1/16; H02K 2213/03; H02K 3/14; H02K 3/24
See application file for complete search history.

(56) References Cited

U.S. PATENT DOCUMENTS

| | | | | |
|---|---|---|---|---|
| 6,791,227 B2* | 9/2004 | Yasuhara | ............... | H02K 3/12 310/179 |
| 6,806,611 B2* | 10/2004 | Bharaj | .................. | H02K 3/12 310/179 |
| 7,287,311 B2* | 10/2007 | Ichikawa | ............... | H02K 3/12 29/596 |
| 8,443,509 B1* | 5/2013 | De Souza | .......... | H02K 15/0081 29/564.2 |
| 8,497,617 B2* | 7/2013 | Dang | ..................... | H02K 3/12 310/201 |
| 8,552,611 B2* | 10/2013 | Matsuoka | .............. | H02K 3/12 310/201 |
| 2019/0312477 A1* | 10/2019 | Vaubel | ................... | H02K 3/24 |

FOREIGN PATENT DOCUMENTS

| | | |
|---|---|---|
| CN | 101860144 A | 10/2010 |
| WO | 2015111287 A1 | 3/2017 |

* cited by examiner

*Primary Examiner* — Minh N Trinh
(74) *Attorney, Agent, or Firm* — Quinn IP Law

(57) ABSTRACT

A method of forming a stator assembly, including providing a stator with a plurality of slots and a plurality of conductors configured to be inserted into the plurality of slots. The method includes obtaining a respective first shape for the plurality of conductors such that the plurality of conductors in the respective first shape forms concentric arcs sharing a common center. Obtaining the respective first shape includes forming a respective first portion, a respective second portion and a respective turn portion between the respective first portion and respective second portion. The method includes obtaining a respective second shape for the plurality of conductors, including: bending the respective first portion at a respective first bend to obtain a respective first leg and a respective first arm, and bending the respective second portion at a respective second bend to obtain a respective second leg and a respective second arm.

13 Claims, 5 Drawing Sheets

US 10,916,985 B2

METHOD OF FORMING A STATOR ASSEMBLY

INTRODUCTION

The present disclosure relates to a method of forming a stator assembly. An electric machine generally includes a stator having a plurality of windings and a rotor rotatable within the stator. In a generator mode, the rotation of the rotor induces voltage in the stator winding for powering an external load, such as charging a battery pack. Alternately, if an electric current is passed through the stator windings, the energized coils may cause the rotor to rotate and the machine will perform as a motor. The stator windings may include multiple blended surfaces which do not allow for direct translation from the design of a 3-D model to forming tools, requiring modifications by a technician.

SUMMARY

Disclosed herein is a method of forming a stator assembly. The method includes providing a stator with a plurality of slots, and a plurality of conductors configured to be inserted into one or more of the plurality of slots. The stator defines a stator edge and a central axis. The method includes obtaining a respective first shape for the plurality of conductors such that the plurality of conductors in the respective first shape forms concentric arcs sharing a common center. Obtaining the respective first shape includes forming a respective first portion, a respective second portion and a respective turn portion between the respective first portion and respective second portion.

The method includes obtaining a respective second shape for the plurality of conductors, including: bending the respective first portion at a respective first bend to obtain a respective first leg and a respective first arm, and bending the respective second portion at a respective second bend to obtain a respective second leg and a respective second arm. The method includes shaping the conductors in a particular way and positioning them in the plurality of slots in a particular way to provide high build quality and repeatability.

The plurality of conductors may include a first conductor, a second conductor and a third conductor. Obtaining the respective second shape for the plurality of conductors may include bending the respective first bend of the second conductor to create a first tip-out angle between the first conductor and the second conductor. Obtaining the respective second shape may include bending the respective first bend of the third conductor to create a second tip-out angle between the second conductor and the third conductor. In one embodiment, the first tip-out angle is 2 degrees and the second tip-out angle is 3 degrees.

The method may include positioning the plurality of conductors in the plurality of slots relative to the stator edge such that a respective reference line forms a 90 degree angle with the respective second bend. The respective second leg defines a respective first tangent and the respective second arm defines a respective second tangent. The respective first tangent intersects with the respective second tangent at a respective intersection point. The respective reference line is defined between the respective intersection point and the central axis at the stator edge.

The method may include positioning the plurality of conductors in the plurality of slots to define a respective axial separation between adjacent ones of the plurality of conductors in an axial direction. The plurality of conductors may be positioned such that the respective axial separation remains a constant in the axial direction, moving away from stator edge. The method may include flowing a coolant in the respective axial separation. In one embodiment, the respective axial separation is between a range of 0.10 and 1.0 mm. In another embodiment, the respective axial separation is between a range of 0.13 and 0.5 mm.

The method may include positioning the plurality of conductors in the plurality of slots to define a respective gap between adjacent ones of the plurality of conductors in a radial direction. The plurality of conductors may be positioned such that the respective gap progressively increases in the axial direction, moving away from the stator edge. Obtaining the respective first shape may include bending the respective turn portion to create first, second, third and fourth turn segments such that each of the first, second, third and fourth turn segments are characterized by measurable surfaces.

Obtaining the respective first shape may include placing the plurality of conductors in a first die, the first die being precision cut such that the plurality of conductors in the respective first shape form the concentric arcs sharing the common center. Obtaining the respective second shape may include placing at least one of the plurality of conductors in a second die. Obtaining the respective first shape and/or respective second shape may include placing at least one of the plurality of conductors between a set of rollers, including a first roller, a second roller and a third roller. The first roller may be configured to move back and forth along a respective first edge of the at least one of the plurality of conductors. The second roller and the third roller may be configured to be stationary and positioned along a respective second edge, opposite of the respective first edge of the at least one of the plurality of conductors.

The above features and advantages and other features and advantages of the present disclosure are readily apparent from the following detailed description of the best modes for carrying out the disclosure when taken in connection with the accompanying drawings.

DETAILED DESCRIPTION

Figure 1:
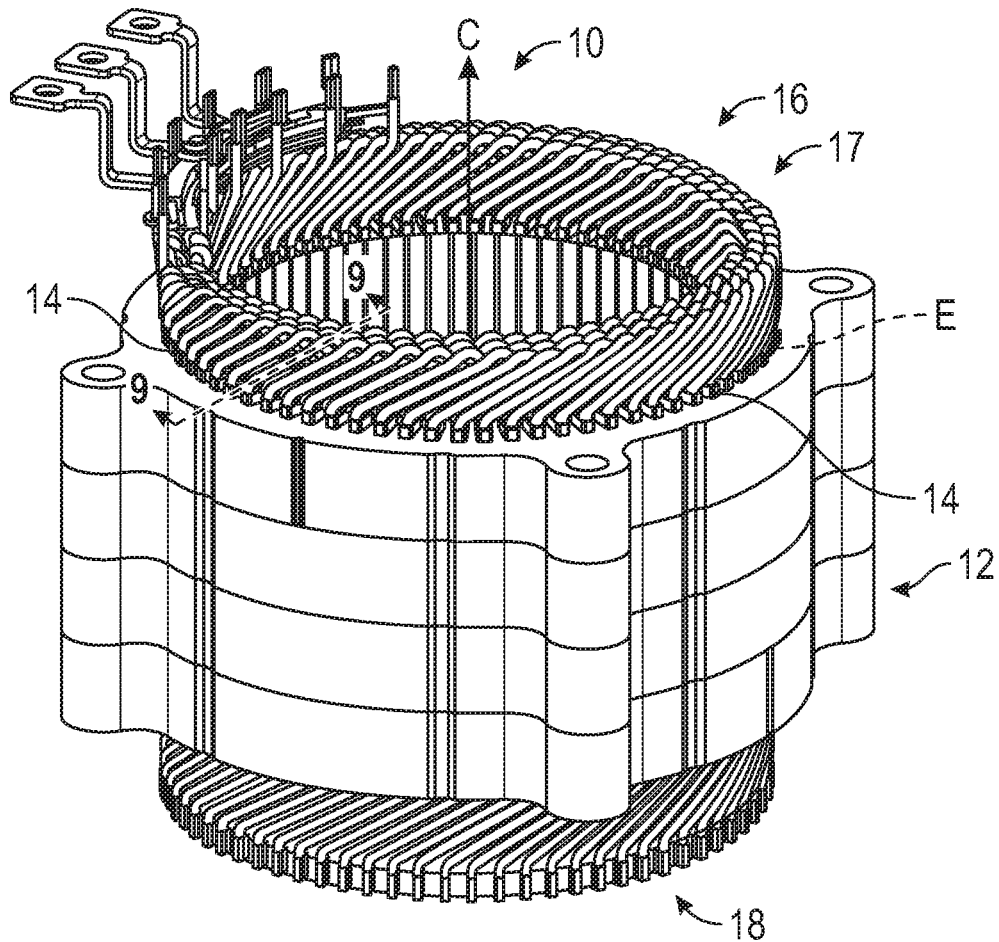
FIG. 1 is a schematic perspective view of a stator assembly having a plurality of conductors.
Figure 2:
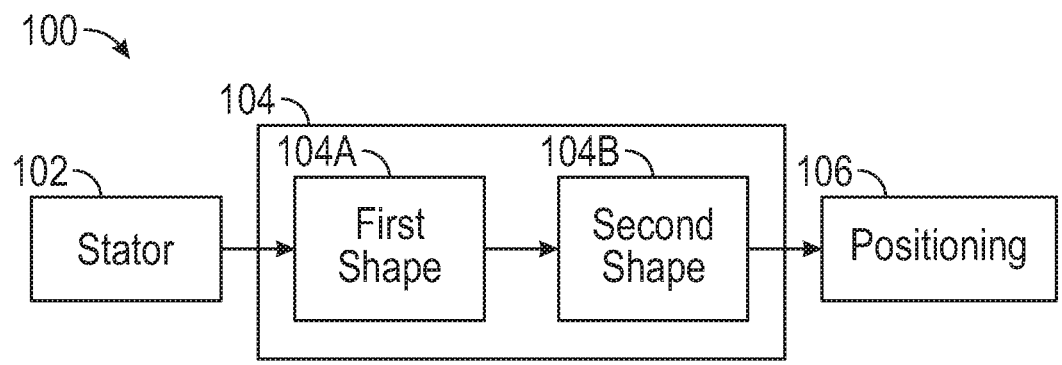
FIG. 2 is a flowchart for a method of forming the stator assembly of FIG. 1.

Referring to the drawings, wherein like reference numbers refer to like components, FIG. 1 schematically illustrates a stator assembly 10. The stator assembly 10 may be part of an electric machine, including but not limited to, a multi-phase alternating current induction machine. The stator assembly 10 includes a stator stack 12. The stator assembly 10 may take many different forms and include multiple and/or alternate components and facilities. FIG. 2 is a flowchart for a method 100 of forming the stator assembly 10. Method 100 need not be applied in the specific order recited herein. Furthermore, it is to be understood that some steps may be eliminated.

Per block 102 of FIG. 2, the method 100 includes providing the stator stack 12 with a plurality of slots 14, between spaced-apart teeth that extend radially from the stator stack 12. Referring to FIG. 1, the stator stack 12 defines a central axis C, in a longitudinal direction, and a stator edge E. Per block 104 of FIG. 2, the method 100 includes providing a plurality of conductors 16 (shown in FIGS. 1 and 3-9) configured to be inserted into one or more of the plurality of slots 14. Block 104 includes blocks 104A and 104B. Per block 104A, the method 100 includes obtaining a respective first shape S1 for the plurality of conductors 16. As described below, per block 104B of FIG. 2, the method 100 includes obtaining a respective second shape S2 for the plurality of conductors 16.

Figure 3:
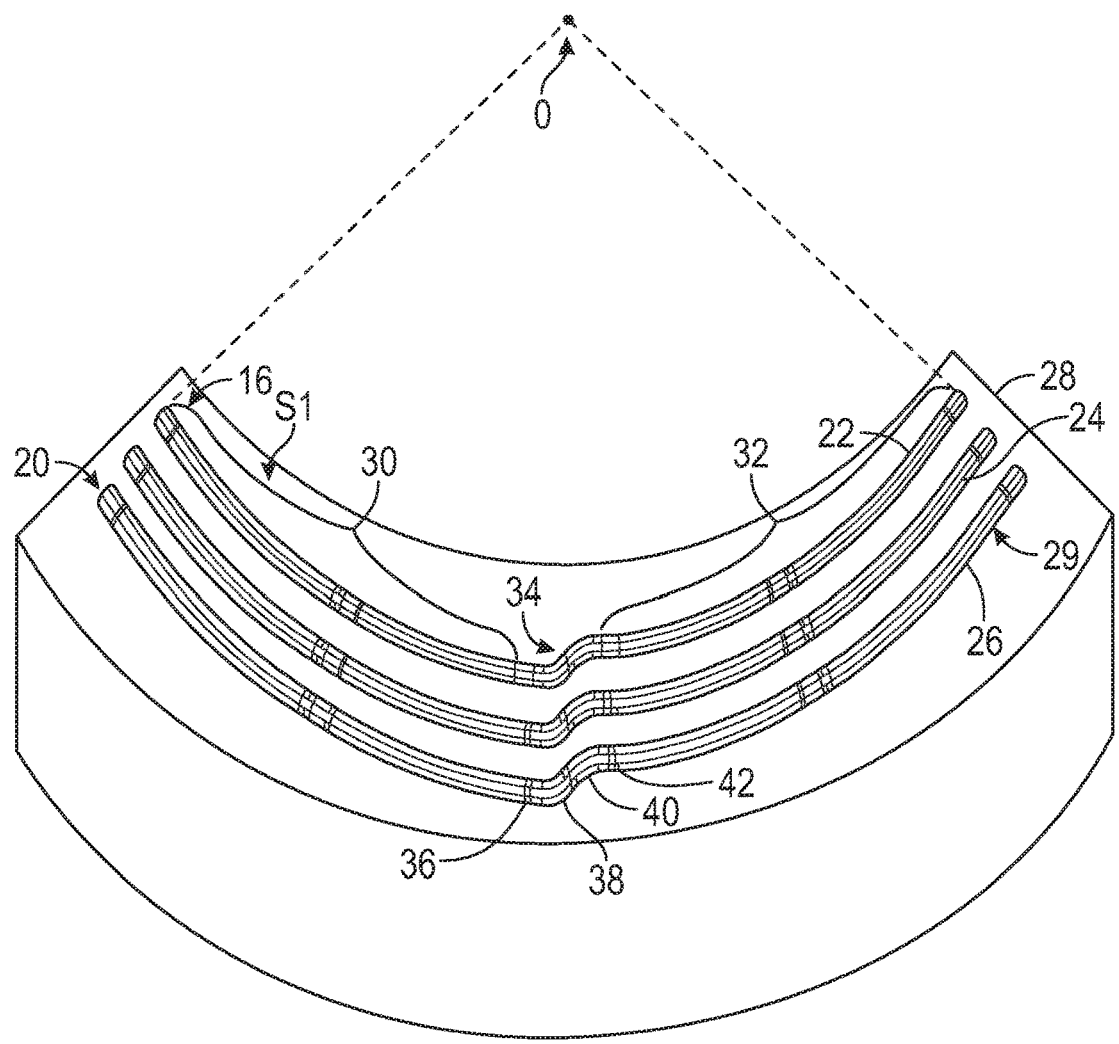
FIG. 3 is a schematic perspective view of the plurality of conductors in a respective first shape formed within a die.

FIG. 3 is a schematic diagram of the plurality of conductors 16 in the respective first shape S1. Per block 104A of FIG. 2, and referring to FIG. 3, the respective first shape S1 is obtained such that the plurality of conductors 16 form concentric arcs 20 sharing a common center O. Referring to FIG. 3, the plurality of conductors 16 may include a first conductor 22, a second conductor 24 and a third conductor 26. The number of the plurality of conductors 16 may be varied based on the application at hand. The respective first shape S1 may be obtained by placing the plurality of conductors 16 in a first die 28, shown in FIG. 3. The first die 28 is configured to be precision cut with contours 29 such that the respective first shapes S1 form the concentric arcs 20 sharing the common center O. The first die 28 may be made from cast iron, steel and ceramic combinations. Other suitable methods of obtaining the respective first shape S1 may be employed.

Referring to FIG. 3, the respective first shape S1 of the plurality of conductors includes a respective first portion 30, a respective second portion 32 and a respective turn portion 34 between the respective first portion 30 and the respective second portion 32. Referring to FIG. 3, obtaining the respective first shape S1 includes bending the respective turn portion 34 to create a first turn segment 36, a second turn segment 38, a third turn segment 40 and a fourth turn segment 42 such that each of the first, second, third and fourth turn segments 36, 38, 40, 42 are characterized by measurable surfaces, i.e., having distinct faces that can be readily measured.

Figure 4:
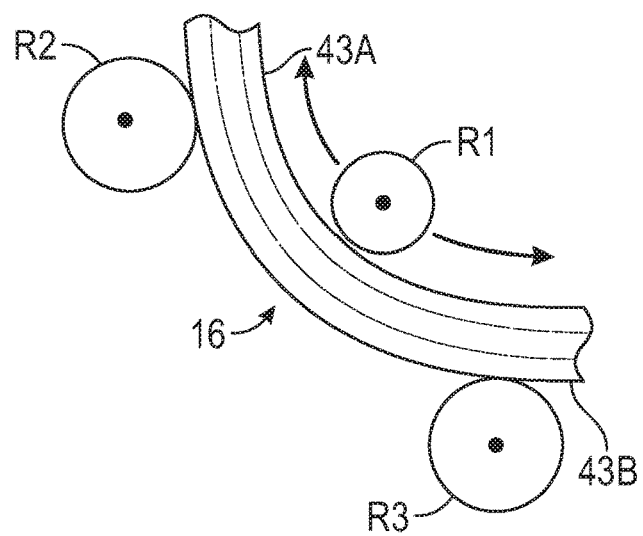
FIG. 4 is a schematic fragmentary side view of one of the plurality of conductors positioned between a set of rollers.

The respective turn portion 34 may be bent using a set of rollers, including a first roller R1, a second roller R2 and a third roller R3, shown in FIG. 4. In one embodiment, the first roller R1 may be configured or programmed to move back and forth along a respective first edge 43A of one of the plurality of conductors 16. Referring to FIG. 4, the second roller R2 and the third roller R3 may be configured to be stationary and positioned along a respective second edge 43B, opposite of the respective first edge 43A. The first roller R1, the second roller R2 and the third roller R3 may be configured to have different sizes, for example, the first roller R1 may be smaller than the second roller R2 and the third roller R3.

Figure 5:
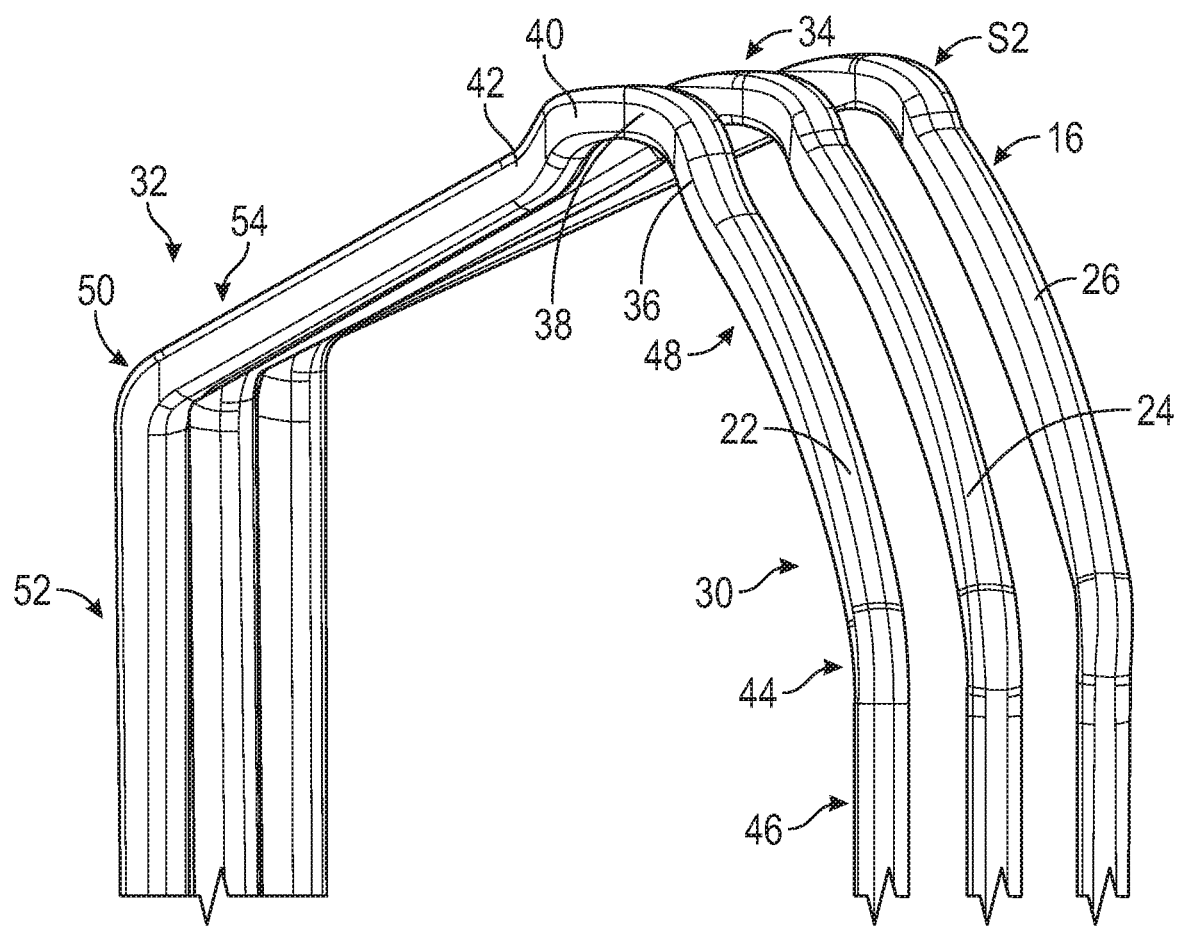
FIG. 5 is a schematic fragmentary perspective view of the plurality of conductors in a respective second shape.

Per block 104B of FIG. 2, the method 100 includes obtaining the respective second shape S2 for the plurality of conductors 16, shown in FIGS. 5-8. Referring to FIG. 5, obtaining the respective second shape S2 includes: bending the respective first portion 30 at a respective first bend 44 to obtain a respective first leg 46 and a respective first arm 48, and bending the respective second portion 32 at a respective second bend 50 to obtain a respective second leg 52 and a respective second arm 54. The respective first leg 46, the respective first arm 48, the respective second leg 52, the respective second arm 54 may be characterized by respective measurable surfaces. In one example, the respective first bend 44 is located approximately mid-way of the total length of the respective first portion 30 and the respective second bend 50 is located approximately mid-way of the total length of the respective second portion 32.

Figure 6:
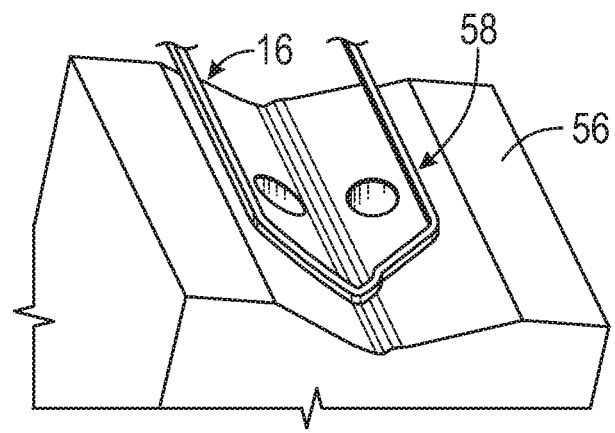
FIG. 6 is a schematic fragmentary perspective view of one of the plurality of conductors in the respective second shape on a die.

Referring to FIG. 6, the respective second shape S2 may be obtained by placing the plurality of conductors 16 in a second die 56. The second die 56 may be precision cut with contours 58 configured to assist in the production of true measurable surfaces. Additionally, bending the respective first portion 30 at the respective first bend 44 may be carried out using the first roller R1, the second roller R2 and the third roller R3, shown in FIG. 4. It is to be understood that other suitable methods may be employed.

Figure 7:
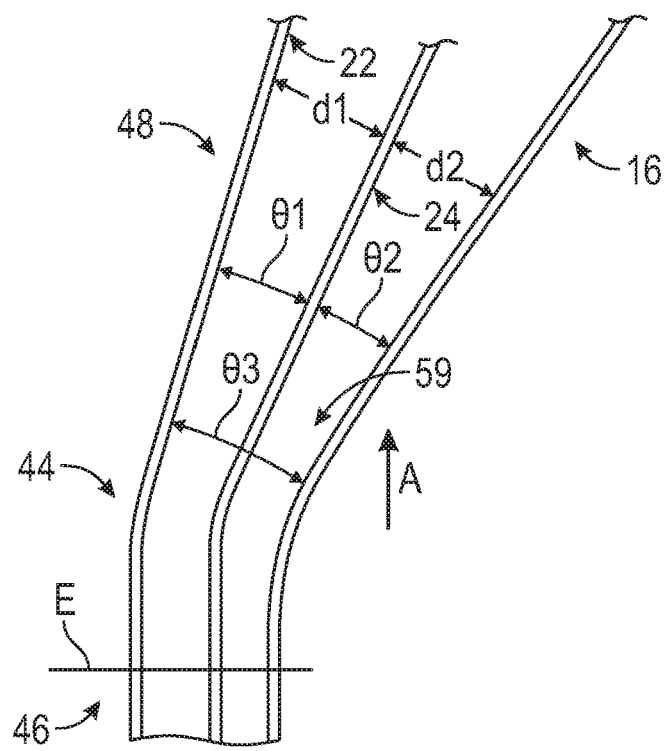
FIG. 7 is a schematic fragmentary side view of the plurality of conductors in the respective second shape.

Referring now to FIG. 7, obtaining the respective second shape S2 (per block 104B of FIG. 2) may include bending the respective first bend 44 of the second conductor 24 to create a first tip-out angle ($\theta_1$) between the first conductor 22 and the second conductor 24. Obtaining the respective second shape S2 may include bending the respective first bend 44 of the third conductor 26 to create a second tip-out angle ($\theta_2$) between the second conductor 24 and the third conductor 26. Bending the respective first portion 30 may be carried out using the first roller R1, the second roller R2 and the third roller R3, shown in FIG. 4. Other suitable methods may be employed. In one embodiment, the first tip-out angle ($\theta_1$) is 2 degrees and the second tip-out angle ($\theta_2$) is 3 degrees. Referring to FIG. 7, the first space d1 (between the first conductor 22 and the second conductor 24) and the second space d2 (between the second conductor 24 and the third conductor 26) is configured to progressively increase in an axial direction A, moving away from stator edge E. The axial direction A is parallel to the central axis C of FIG. 1. The increasing space between the layers "tipped out" in consecutively increasing amounts allows for flow of coolant 59 in between the plurality of conductors 16, and leads to increased life of the stator assembly 10.

Figure 8:
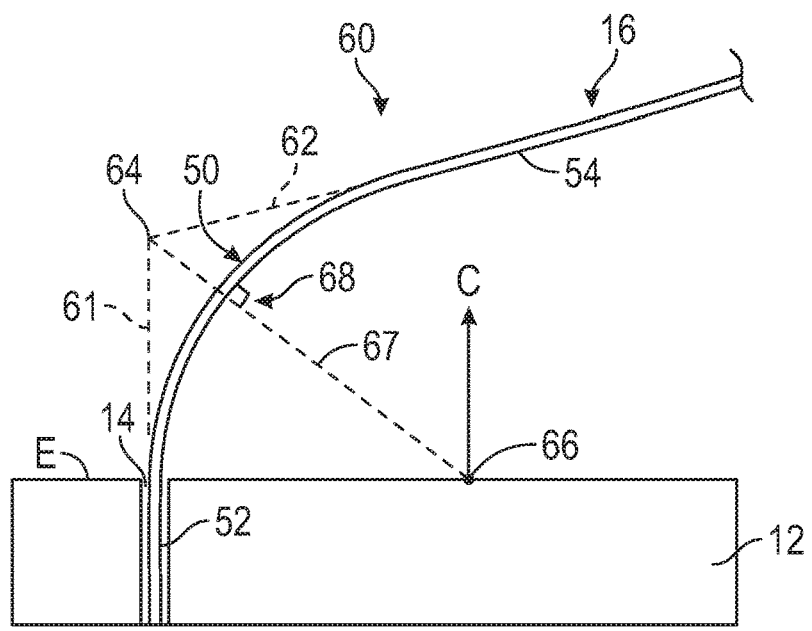
FIG. 8 is a schematic fragmentary side view of one of the plurality of conductors in the respective second shape, showing its position relative to the stator edge.
Figure 9:
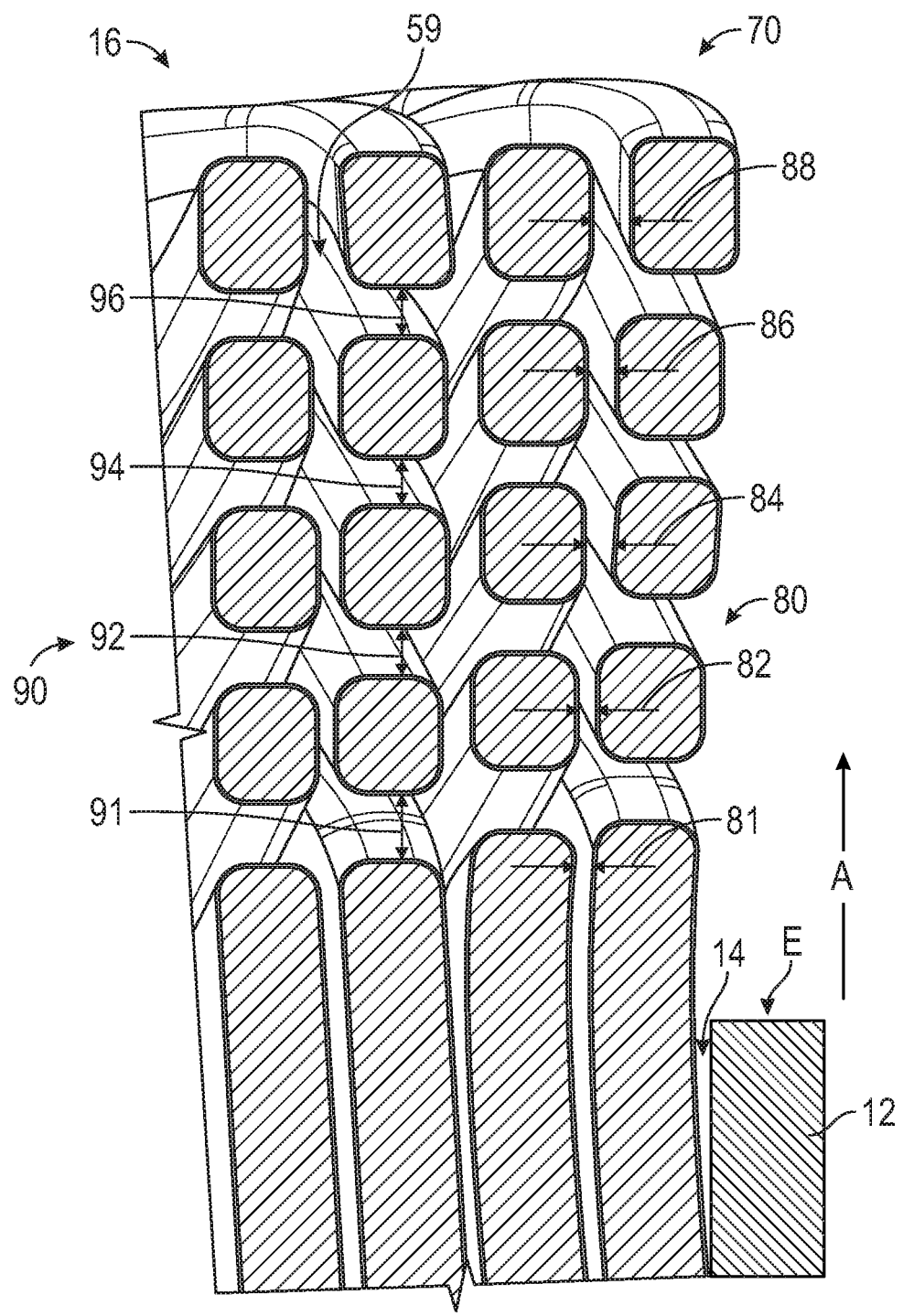
FIG. 9 is a schematic fragmentary partly-perspective partly-sectional view of the stator assembly, taken through axis 9-9 of FIG. 1.

Per block 106 of FIG. 2, the method 100 includes positioning the plurality of conductors 16 in the plurality of slots 14 relative to the stator edge E in at least one of a first configuration 60 (shown in FIG. 8) and a second configuration 70 (see FIG. 9). Referring to FIG. 1, the plurality of conductors 16 may be inserted into the plurality of slots 14 at a crown side 17 of the stator stack 12, with each leg positioned in a different slot. Once each of the plurality of conductors 16 are threaded into the plurality of slots 14, their respective distal portions may be individually twisted (see twisted side 18 in FIG. 1) and connected to multi-phase AC windings.

The first configuration 60 is shown in FIG. 8. Referring to FIG. 8, the respective second leg 52 defines a respective first tangent 61 and the respective second arm 54 defines a respective second tangent 62. Referring to FIG. 8, the respective first tangent 61 intersects with the respective second tangent 62 at a respective intersection point 64. A respective reference line 67 is defined between the respective intersection point 64 and a point 66 at the stator edge E. The plurality of conductors 16 may be positioned such that the respective reference line 67 forms an angle 68 of 90 degrees with the respective second bend 50. In non-limiting embodiment, the point 66 may coincide with the central axis C of the stator stack 12 (see FIG. 1).

The second configuration 70 is shown in FIG. 9, which is a schematic fragmentary partly perspective, partly sectional view taken through axis 9-9 of FIG. 1. The second configuration 70 is characterized by a respective gap 80 and a respective axial separation 90 between adjacent ones of the plurality of conductors 16. Referring to FIG. 9, the plurality of conductors 16 defines a respective gap 80, such as first gap 81, second gap 82, third gap 84, fourth gap 86, fifth gap 88, between adjacent ones of the plurality of conductors 16. The respective gap 80 extends in a radial direction perpendicular to the axial direction A. The plurality of conductors 16 may be positioned such that the respective gap 80 progressively increases in the axial direction A, moving away from stator edge E. The axial direction A is parallel to the central axis C of FIG. 1.

Referring to FIG. 9, the plurality of conductors 16 defines a respective axial separation 90, such as first axial separation 91, second axial separation 92, third axial separation 94, fourth axial separation 96, between adjacent ones of the plurality of conductors 16 in an axial direction A. The plurality of conductors 16 may be positioned such that the respective axial separation 90 remains a constant in the axial direction A, relative to the stator edge E. In one example, the respective axial separation 90 is between a range of about 0.10 and 1.0 mm. In another example, the respective axial separation 90 is between a range of about 0.13 and 0.50 mm. The respective axial separation 90 is configured to be sufficiently large to allow flow of coolant 59 between the plurality of conductors 16.

In summary, the method 100 includes shaping the plurality of conductors 16 in a particular way and positioning them in the plurality of slots 14 of the stator assembly in a particular way to provide high build quality and repeatability. The method 100 provides a technical benefit of reduced design time and ability to go from the design of a 3-D model to manufacturing. The method 100 allows the production of true, measureable surfaces on each surface, allowing for creation of a more accurate die blade surface.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of forming a stator assembly, the method comprising:
providing a stator with a plurality of slots, the stator defining a stator edge and a central axis;
providing a plurality of conductors configured to be inserted into one or more of the plurality of slots;
obtaining a respective first shape for the plurality of conductors such that the plurality of conductors in the respective first shape form concentric arcs sharing a common center;
wherein obtaining the respective first shape includes forming a respective first portion, a respective second portion and a respective turn portion between the respective first portion and respective second portion;
obtaining a respective second shape for the plurality of conductors, including bending the respective first portion at a respective first bend to obtain a respective first leg and a respective first arm, and bending the respective second portion at a respective second bend to obtain a respective second leg and a respective second arm; and
wherein the plurality of conductors includes a first conductor, a second conductor and a third conductor, and obtaining the respective second shape for the plurality of conductors includes:
bending the respective first bend of the second conductor to create a first tip-out angle between the first conductor and the second conductor; and
bending the respective first bend of the third conductor to create a second tip-out angle between the second conductor and the third conductor.

2. The method of claim 1, wherein the first tip-out angle is 2 degrees and the second tip-out angle is 3 degrees.

3. The method of claim 1, further comprising:
positioning the plurality of conductors in the plurality of slots relative to the stator edge such that a respective reference line forms a 90 degree angle with the respective second bend;
wherein the respective second leg defines a respective first tangent, the respective second arm defines a respective second tangent, the respective first tangent intersecting with the respective second tangent at a respective intersection point; and
wherein the respective reference line is defined between the respective intersection point and the central axis at the stator edge.

4. The method of claim 1, further comprising:
positioning the plurality of conductors to define a respective axial separation between adjacent ones of the plurality of conductors in an axial direction;
positioning the plurality of conductors in the plurality of slots such that the respective axial separation remains a constant in the axial direction moving away from the stator edge.

5. The method of claim 4, further comprising:
flowing a coolant in the respective axial separation; and
wherein the respective axial separation is between a range of 0.10 and 1.0 mm.

6. The method of claim 1, further comprising:
positioning the plurality of conductors to define a respective gap between adjacent ones of the plurality of conductors in a radial direction; and
positioning the plurality of conductors in the plurality of slots such that the respective gap progressively increases in an axial direction moving away from the stator edge.

7. The method of claim 1, wherein obtaining the respective first shape includes:
bending the respective turn portion to create first, second, third and fourth turn segments such that each of the first, second, third and fourth turn segments are characterized by measurable surfaces.

8. The method of claim 1, wherein obtaining the respective first shape includes:
placing the plurality of conductors in a first die, the first die being precision cut such that the plurality of conductors in the respective first shape form the concentric arcs sharing the common center.

9. The method of claim 1, wherein obtaining the respective second shape includes:
placing at least one of the plurality of conductors between a set of rollers, including a first roller, a second roller and a third roller;
wherein the first roller is configured to move back and forth along a respective first edge of the at least one of the plurality of conductors; and
wherein the second roller and the third roller are configured to be stationary and positioned along a respective second edge, the respective second edge being opposite of the respective first edge of the at least one of the plurality of conductors.

10. A method of forming a stator assembly, the method comprising:
providing a stator with a plurality of slots, the stator defining a stator edge and a central axis;
providing a plurality of conductors configured to be inserted into one or more of the plurality of slots;
obtaining a respective first shape for the plurality of conductors such that the plurality of conductors in the respective first shape form concentric arcs sharing a common center, wherein obtaining the respective first shape includes forming a respective first portion, a respective second portion and a respective turn portion between the respective first portion and respective second portion;
obtaining a respective second shape for the plurality of conductors, including bending the respective first portion at a respective first bend to obtain a respective first leg and a respective first arm, and bending the respective second portion at a respective second bend to obtain a respective second leg and a respective second arm;
positioning the plurality of conductors in the plurality of slots relative to the stator edge such that a respective reference line forms a 90 degree angle with the respective second bend;
wherein the respective second leg defines a respective first tangent, the respective second arm defines a respective second tangent, the respective first tangent intersecting with the respective second tangent at a respective intersection point; and
wherein the respective reference line is defined between the respective intersection point and the central axis at the stator edge.

11. A method of forming a stator assembly, the method comprising:
providing a stator with a plurality of slots, the stator defining a stator edge and a central axis;
providing a plurality of conductors configured to be inserted into one or more of the plurality of slots;
obtaining a respective first shape for the plurality of conductors such that the plurality of conductors in the respective first shape form concentric arcs sharing a common center;
wherein obtaining the respective first shape includes forming a respective first portion, a respective second portion and a respective turn portion between the respective first portion and respective second portion;
obtaining a respective second shape for the plurality of conductors, including bending the respective first portion at a respective first bend to obtain a respective first leg and a respective first arm, and bending the respective second portion at a respective second bend to obtain a respective second leg and a respective second arm;
positioning the plurality of conductors to define a respective axial separation between adjacent ones of the plurality of conductors in an axial direction;
positioning the plurality of conductors in the plurality of slots such that the respective axial separation remains a constant in the axial direction moving away from the stator edge; and
flowing a coolant in the respective axial separation, the respective axial separation being between a range of 0.10 and 1.0 mm.

12. The method of claim 11, wherein obtaining the respective first shape includes:
placing the plurality of conductors in a first die, the first die being precision cut such that the plurality of conductors in the respective first shape form the concentric arcs sharing the common center.

13. The method of claim 11, wherein obtaining the respective second shape includes:
placing at least one of the plurality of conductors between a set of rollers, including a first roller, a second roller and a third roller;
wherein the first roller is configured to move back and forth along a respective first edge of the at least one of the plurality of conductors; and
wherein the second roller and the third roller are configured to be stationary and positioned along a respective second edge, the respective second edge being opposite of the respective first edge of the at least one of the plurality of conductors.

* * * * *